United States Patent
Orndorff et al.

(10) Patent No.: US 9,751,291 B2
(45) Date of Patent: Sep. 5, 2017

(54) METHOD AND APPARATUS FOR SEALING TWO MOVING WEBS OF MATERIAL TOGETHER, WHICH WEBS HAVE PORTIONS WHICH ARE NON-PLANAR

(71) Applicant: The Procter & Gamble Company, Cincinnati, OH (US)

(72) Inventors: Jason Matthew Orndorff, Lawrenceburg, IN (US); Shawn Christopher Pallotta, Maineville, OH (US)

(73) Assignee: The Procter & Gamble Company, Cincinnati, OH (US)

(*) Notice: Subject to any disclaimer, the term of this patent is extended or adjusted under 35 U.S.C. 154(b) by 627 days.

(21) Appl. No.: 14/199,040

(22) Filed: Mar. 6, 2014

(65) Prior Publication Data

US 2015/0251403 A1 Sep. 10, 2015

(51) Int. Cl.
*B32B 38/00* (2006.01)
*B65B 51/14* (2006.01)
(Continued)

(52) U.S. Cl.
CPC .......... *B32B 38/0012* (2013.01); *B65B 9/023* (2013.01); *B65B 9/042* (2013.01);
(Continued)

(58) Field of Classification Search
CPC .......... B65B 9/02; B65B 9/023; B65B 51/10; B65B 51/26; B65B 51/30; B65B 51/303; B29C 65/18; B29C 65/7457; B29C 66/1122; B29C 66/133; B29C 66/344; B29C 66/4312; B29C 66/432; B29C 66/72321; B29C 66/72341; B29C 66/73713; B29C 66/81429;
(Continued)

(56) References Cited

U.S. PATENT DOCUMENTS 2,655,978 A 10/1953 Gonda et al.
3,066,932 A 12/1962 Greiner et al.
(Continued)

FOREIGN PATENT DOCUMENTS

EP 0364048 A1 4/1990
EP 2292520 A1 3/2011
(Continued)

OTHER PUBLICATIONS

"Improving Forming Shoulder Design" article, University of Bath Dept. of Mechanical Engineering, 1 page, www.bath.ac.uk/~ensgm/shoulder.pdf.
(Continued)

*Primary Examiner* — Hemant M Desai
*Assistant Examiner* — Valentin Neacsu
(74) *Attorney, Agent, or Firm* — Carl J. Roof

(57) ABSTRACT

A method and apparatus for pleating or otherwise shaping a web are described herein. The method and apparatus may have numerous applications. In some embodiments, the method and apparatus are used in the formation, filling, and sealing of unit dose packages for consumer products. A method and apparatus for forming sealing two moving webs together, which webs have portions that are non-planar are also described herein.

9 Claims, 10 Drawing Sheets

(51) Int. Cl.
*B65B 51/30* (2006.01)
*B65B 9/02* (2006.01)
*B65B 9/04* (2006.01)
*B29C 65/00* (2006.01)
*B65B 39/00* (2006.01)
*B29C 65/18* (2006.01)
*B29C 65/74* (2006.01)

(52) U.S. Cl.
CPC .......... *B65B 51/146* (2013.01); *B65B 51/303* (2013.01); *B29C 65/18* (2013.01); *B29C 65/7457* (2013.01); *B29C 66/1122* (2013.01); *B29C 66/133* (2013.01); *B29C 66/344* (2013.01); *B29C 66/432* (2013.01); *B29C 66/4312* (2013.01); *B29C 66/72321* (2013.01); *B29C 66/72341* (2013.01); *B29C 66/73713* (2013.01); *B29C 66/8161* (2013.01); *B29C 66/81429* (2013.01); *B29C 66/81431* (2013.01); *B29C 66/83221* (2013.01); *B29C 66/849* (2013.01); *B29C 66/8432* (2013.01); *B32B 2038/0028* (2013.01); *B32B 2250/02* (2013.01); *B65B 2039/009* (2013.01)

(58) Field of Classification Search
CPC .......... B29C 66/81431; B29C 66/8161; B29C 66/83221; B29C 66/8432; B29C 66/849
USPC ........ 53/546, 553, 554, 373.6, 374.2, 374.8; 156/324, 459
See application file for complete search history.

(56) References Cited

U.S. PATENT DOCUMENTS

| | | | |
|---|---|---|---|
| 3,165,310 A | | 1/1965 | Peterson |
| 3,401,927 A | | 9/1968 | Frick et al. |
| 3,784,186 A | | 1/1974 | Lenthall et al. |
| 4,170,347 A | | 10/1979 | Lewis |
| 4,349,997 A | * | 9/1982 | Hayasaka ............... B65B 41/18 156/351 |
| 4,433,527 A | * | 2/1984 | Ramsey ................ B29C 65/18 156/583.1 |
| 5,589,014 A | | 12/1996 | Hicks |
| 5,682,732 A | * | 11/1997 | Selberg ................... B29C 66/43 219/243 |
| 6,041,580 A | * | 3/2000 | Wojtech ................ B29C 65/18 53/371.2 |
| 6,167,681 B1 | * | 1/2001 | Yano .................... B29C 65/3656 53/373.7 |
| 6,481,188 B1 | * | 11/2002 | Graham ................ B29C 66/003 53/373.5 |
| 6,506,329 B1 | | 1/2003 | Curro et al. |
| 7,235,115 B2 | | 6/2007 | Duffy et al. |
| 7,963,899 B2 | | 6/2011 | Papsdorf et al. |
| 8,225,583 B2 | * | 7/2012 | Waldherr ................ B29C 65/18 53/371.8 |
| 8,572,936 B2 | * | 11/2013 | Mancin ................... B29C 65/02 53/373.7 |
| 2011/0000613 A1 | * | 1/2011 | Cigallio ................. B29C 65/18 156/290 |
| 2012/0005993 A1 | | 1/2012 | Doll |

FOREIGN PATENT DOCUMENTS

| | | |
|---|---|---|
| GB | 1433910 | 4/1976 |
| IN | 189471 | 3/2003 |

OTHER PUBLICATIONS

Website for Former Fab® Company as Feb. 1, 2014, http://www.former-fab.de/en/ideas-innovations/longitudinal-corrugating-technology/.
U.S. Appl. No. 13/776,753, filed Feb. 26, 2013, Shawn Christopher Pallotta et al.
U.S. Appl. No. 14/198,985, filed Mar. 6, 2014, Jason Matthew Orndorff.
U.S. Appl. No. 14/199,002, filed Mar. 6, 2014, Jason Matthew Orndorff.
PCT International Search Report, mailed May 19, 2015, 33 pages.

* cited by examiner

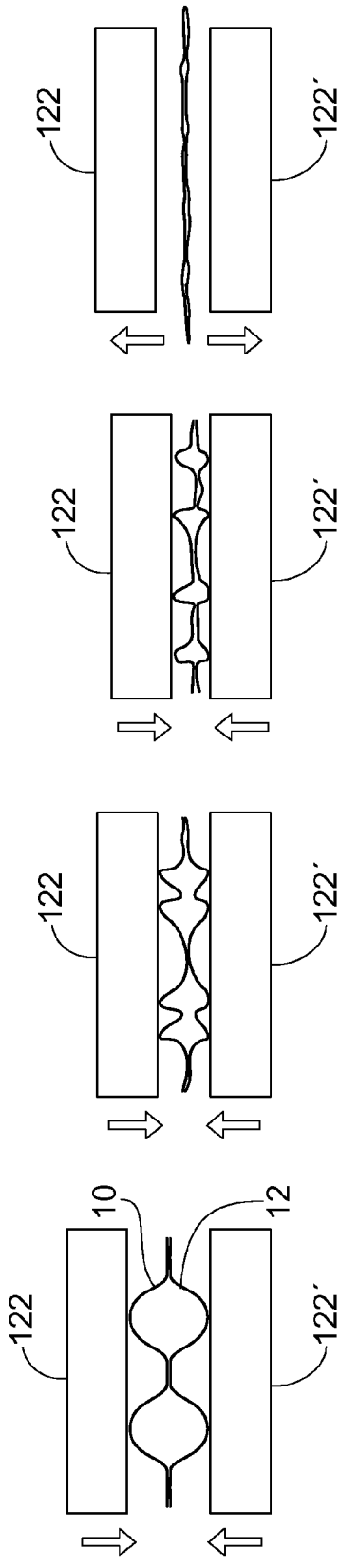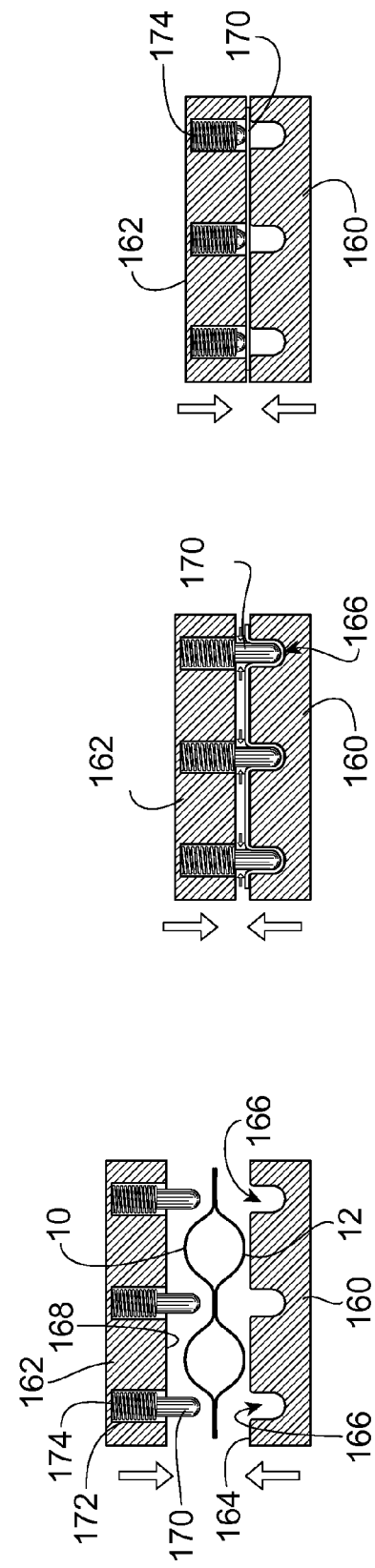

METHOD AND APPARATUS FOR SEALING TWO MOVING WEBS OF MATERIAL TOGETHER, WHICH WEBS HAVE PORTIONS WHICH ARE NON-PLANAR

FIELD

A method and apparatus for pleating or otherwise shaping a web are described herein. The method and apparatus have numerous applications. In some cases, the method and apparatus are used as part of a process of forming, filling, and sealing unit dose packages for consumer products. A method and apparatus for sealing two moving webs of material together, which webs of material have portions which are non-planar, are also described herein.

BACKGROUND

Methods for pleating or otherwise shaping a web can be used for a variety of purposes. Pleated webs can, for example, be useful in the construction of diapers and other absorbent articles, filters, window shades, and other articles. Methods of pleating webs are described in: U.S. Pat. No. 2,655,978, Gonda, et al.; U.S. Pat. No. 3,066,932, Greiner, et al; U.S. Pat. No. 3,165,310, Peterson; U.S. Pat. No. 3,401,927, Frick, et al.; U.S. Pat. No. 3,784,186, Lenthall, et al.; U.S. Pat. No. 5,589,014, Hicks; U.S. Pat. No. 4,170,347, Lewis; U.S. Pat. No. 7,235,115, Duffy, et al.; U.S. Pat. No. 7,963,899 B2, Papsdorf, et al.; EP 0364084 A1; Indian Patent Publication 189471; and UK Patent 1 433 910. In addition, a company by the name of Former Fab makes a device for corrugating a web. The webs that can be formed by its equipment are found on the website www.former-fab.de/en/ideas-innovations/longitudinal-corrugating-technology.

Applicants have found the need for an improved process for shaping a web in an area in which webs are typically more randomly shaped—in vertical forming, filling and sealing (VFFS) processes for making packages for unit doses of liquid products. Unit doses of liquid products such as shampoo and hair conditioner are often placed in relatively thin, flat packages known as sachets. Such sachets are typically provided with water vapor barrier properties to prevent water loss from the product in the package over time. Sachets of this type are generally made using vertical forming, filling and sealing (VFFS) processes.

Current processes exist for vertical forming, filling and sealing, both intermittently and continuously. Vertical forming, filling and sealing (VFFS) processes typically employ fill nozzles that are inserted in between two layers of material used to form the package. Current VFFS machines may have up to twelve nozzles lined up in a row across the width of the two webs of material in order to form and fill twelve sachets at the same time. These processes rely on the webs of material being forced together between the nozzles and held apart by the nozzles in order to create a space into which the product is dispensed by the nozzles. When the webs are forced together between nozzles, longitudinal seals are formed between the webs to close the sides of the sachets, and transverse seals are formed between each dose dispensed by the nozzles.

One problem with existing VFFS systems is that reliance upon the webs of material forming a space to dispense product as they pass around the nozzles is not precise, and can result in uneven widths of material forming different sides of the sachets. Thus, the material from one of the webs that forms the front of the sachet may have a different width than the material from the other web of material that forms the back of the sachet. This can lead to wrinkling of the sachets. Further, the wrinkling of webs can interfere with the formation of the transverse seals, so that the materials are not completely sealed together, leading to leaky sachets.

The search for improved methods and apparatuses for pleating or otherwise shaping a web, as well as improved package forming processes has, therefore, continued.

SUMMARY

A method and apparatus for pleating or otherwise shaping a web are described herein. The method involves shaping a web that is moving in a machine direction. The method includes providing a forming guide which comprises a web-facing surface. The web-facing surface of the forming guide may be configured to provide a substantially equal path length across the width of its web-facing surface. The web is formed by passing the web over and at least partially in contact with the web-facing surface of the forming guide to form longitudinally-oriented folds in the web.

The method and apparatus may have numerous applications. In some cases, the method and apparatus are used in the formation, filling, and sealing of unit dose packages for consumer products. The method may comprise feeding a first web of material and a second web of material into a package forming apparatus in a machine direction. The package forming apparatus comprises at least one nozzle for dispensing a product in between the webs. The method comprises passing at least one of the first and second webs of material adjacent to a forming guide to at least temporarily shape at least one of the first and second webs of material across the width of the same to space at least a portion of at least one of the first and second webs of material away from the nozzle. A product may be dispensed between the webs of material using the nozzle, and portions of the webs of material can be sealed together with the product therebetween to form a package containing the product.

A method and apparatus for sealing two moving webs of material together, which webs of material have portions which are non-planar, are also described herein. The method comprises feeding a first web of material and a second web of material into an apparatus in a machine direction generally parallel to each other along at least a portion of their lengths. At least one of the webs of material has non-planar portions therein that are formed across the width of the web. The method comprises providing a component having a web-contacting surface with at least one recess therein, and forcing at least a portion of the webs into the recess in the web-contacting surface of the component with the recess therein in order to stretch and flatten at least some of the non-planar portions in the webs; and sealing portions of the webs of material together across the flattened non-planar portions.

BRIEF DESCRIPTION OF THE DRAWINGS

FIG. 15A is a schematic cross-sectional view of a shaped pair of webs in between prior art cross-machine direction sealing bars, which are in a first position in a sealing sequence.

FIG. 15B is a schematic cross-sectional view of a shaped pair of webs in between prior art cross-machine direction sealing bars, which are in a second position in a sealing sequence.

FIG. 15C is a schematic cross-sectional view of a shaped pair of webs in between prior art cross-machine direction sealing bars, which are in a third position in a sealing sequence.

FIG. 15D is a schematic cross-sectional view of a shaped pair of webs in between prior art cross-machine direction sealing bars, which are in a fourth position in a sealing sequence.

FIG. 16A is a schematic cross-sectional view of a shaped pair of webs in between a new apparatus for forming cross-machine direction seals, which is in a first position in a sealing sequence.

FIG. 16B is a schematic cross-sectional view of the apparatus shown in FIG. 16A, which is in a second position in a sealing sequence.

FIG. 16C is a schematic cross-sectional view of the apparatus shown in FIG. 16A, which is in a third position in a sealing sequence.

DETAILED DESCRIPTION

A method and apparatus for pleating or otherwise shaping a web are described herein. The term "shaping", as used herein, refers to altering the configuration of a planar web in a controlled manner. The term "shaping" includes, but not limited to: forming the web without necessarily forming a fold in the same; at least partially folding the web without either forming a crease in the web or doubling over the web on itself; folding a portion of the web onto itself; and forming multiple side-by-side folds or pleats in the web. The method and apparatus have numerous applications.

Figure 1:
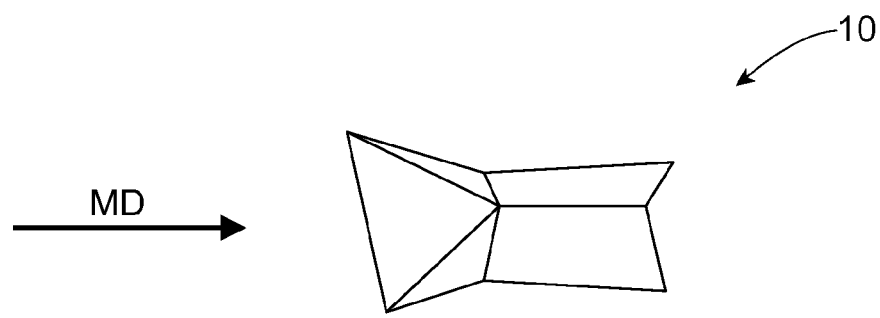
FIG. 1 is an example of a web passing over a prior art folding board to form a single pleat in a web.

FIG. 1 is an example of a web 10 passing over a prior art folding board to form a single pleat in the moving web. The arrow represents the direction of movement of the web, which will be referred to as the machine direction (or "MD"). The direction perpendicular to the machine direction in the plane of the incoming unfolded web is known as the cross-machine direction (or "CD"). The folding board used to form the web shown in FIG. 1, for reasons explained below, is not suitable for forming multiple side-by-side pleats in a web.

Figure 2:
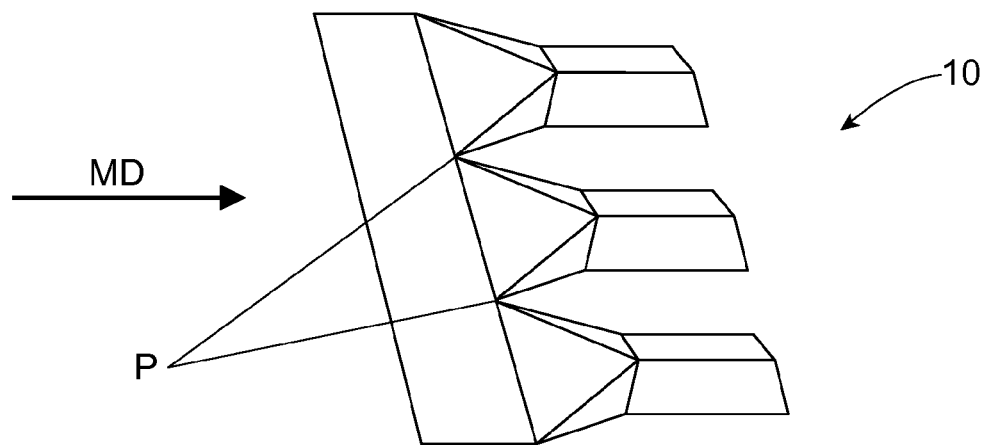
FIG. 2 is an example of a web passing over a plurality of prior art folding boards arranged side-by-side in an attempt to produce multiple pleats in a web.

FIG. 2 is an example of a web passing over a modified prior art folding apparatus comprising three adjacent prior art folding boards arranged in an effort to produce multiple pleats in a web 10. As shown in FIG. 2, it was considered to place a series of the prior art folding board shapes side-by-side to produce multiple pleats in a web, but this requires the web to be split (or slit) between each pleat such as at points P, which was not desired. The web will typically not be able to stretch sufficiently in the cross-machine direction to remain pleated and still span between these side-by-side folding boards. For this reason, such a folding apparatus design is unsuitable for uses in which the apparatus is required to form multiple side-by-side pleats in a single web.

The Forming Apparatus

Figure 3:
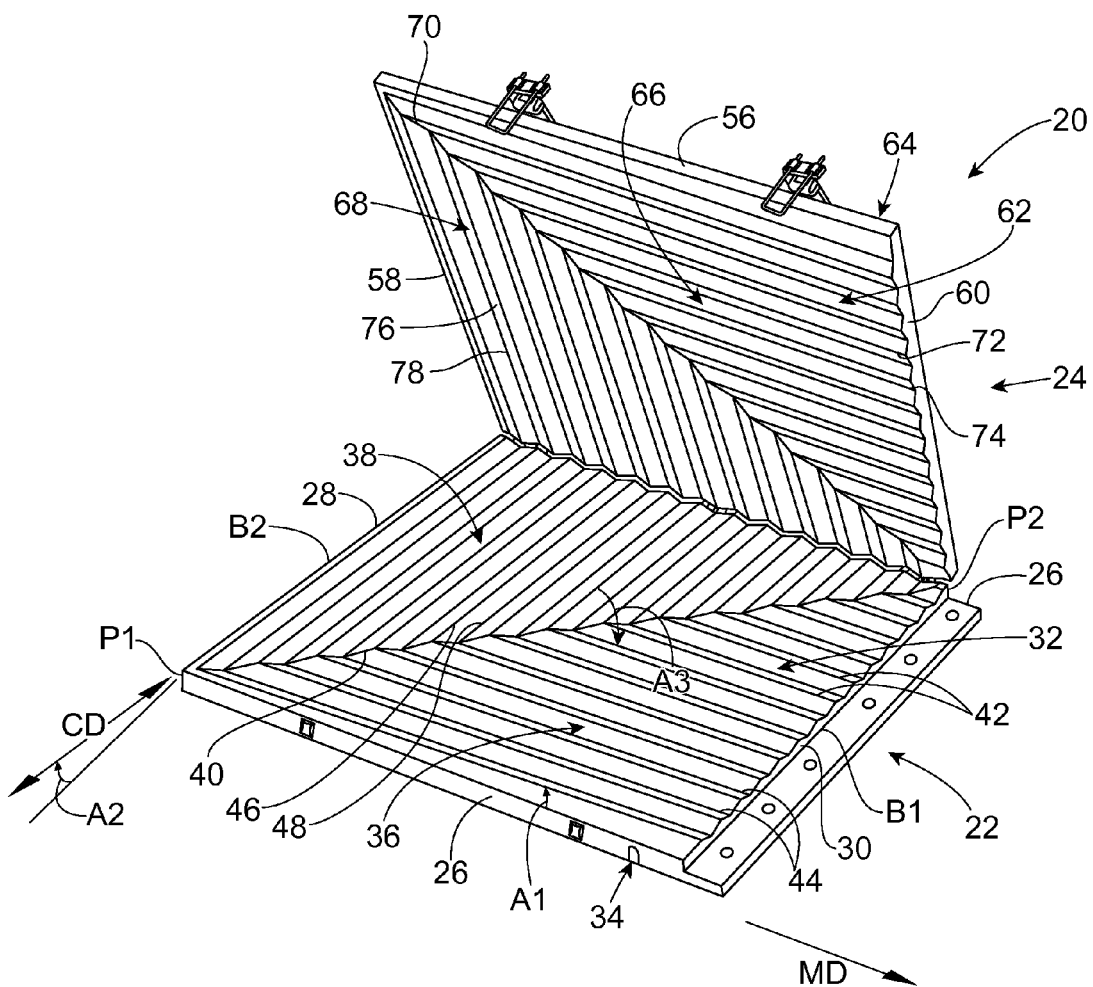
FIG. 3 is a perspective view of one example forming apparatus including a forming guide for shaping a web.
Figure 6:
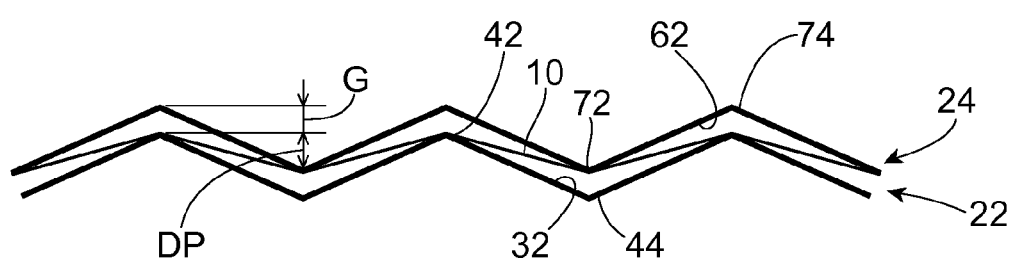
FIG. 6 is a schematic end view showing how a forming guide and a mating component can be positioned relative to each other with a web therebetween.
Figure 13:
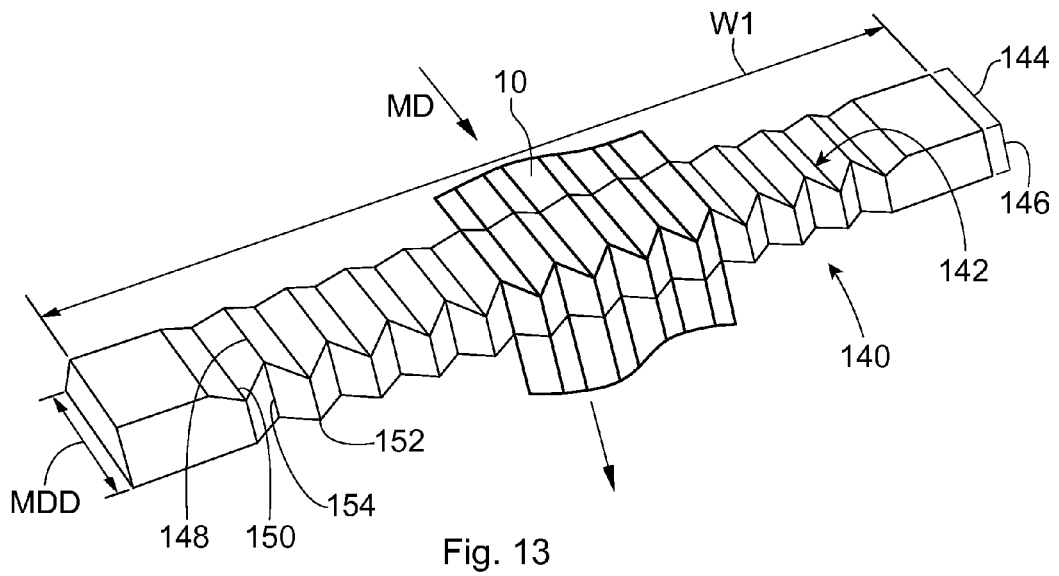
FIG. 13 is a schematic perspective view of one embodiment of a turning guide for turning one of the shaped webs of material.
Figure 14:
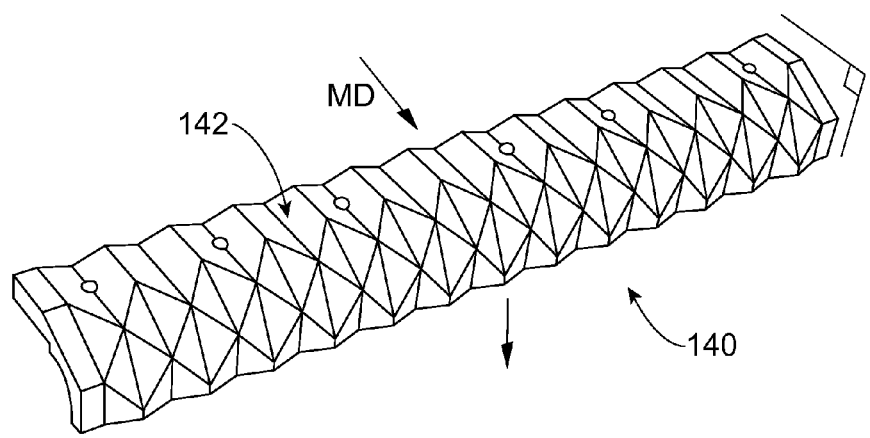
FIG. 14 is a schematic perspective view of another embodiment of a turning guide for turning one of the shaped webs of material.

FIG. 3 shows one example of a forming apparatus 20 for pleating or otherwise shaping a web as described herein. The forming apparatus 20 comprises a forming guide 22 and a device or a mechanism for maintaining the web at least partially in contact with the forming guide 22. In some cases, the device for maintaining the web at least partially in contact with the forming guide 22 may comprise an optional mating component 24. The forming guide 22 may comprise two side edges 26, an upstream end 28 having an end edge, a downstream end 30 having an end edge, a web-facing surface 32 and an opposing surface 34. The configuration of the web-facing surface 32 of the forming guide 22 is described in greater detail below. The opposing surface 34 can be of any suitable configuration including, but not limited to: flat (as shown in FIG. 3), corrugated (as shown in FIG. 6), or angled or curved (as shown in FIGS. 13 and 14).

It should be understood that while the forming apparatus 20 shown in FIG. 3 is configured to form multiple side-by-side temporary pleats in a web, the forming guide 22 can be in numerous other configurations. Such other configurations include, but are not limited to those in which: the forming guide 22 is configured to: shape (or "form") the web; provide a single fold or pleat in a web; at least partially fold the web without either forming a crease in the web or doubling over the web on itself; and fold or pleat the web. In any case, the web will be bent in the cross-machine direction about at least one generally machine direction-oriented axis. The forming apparatus 20 can, as discussed, form a plurality of pleats in the web. In some processes, the fold(s) can be permanently formed into the web. In other processes, the fold(s) may only be temporarily formed, so that no permanent crease is formed in the web.

In the embodiment shown in FIG. 3, the web-facing surface 32 of the forming guide 22 comprises a first region (or "downstream region") 36 and a second region (or "upstream region") 38. The first region 36 and second region 38 can have any suitable plan view configurations. In the example of the forming guide 22 shown, the first region 36 and second region 38 have a boundary therebetween. In this case, the boundary is a diagonal boundary 40. The diagonal boundary 40 can be thought of as separating the web-facing surface 32 of the forming guide 22 into two generally triangular fields when viewed from above (plan view). These comprise a first triangular field that comprises the first region 36, and the second triangular field that comprises the second region 38.

As shown in FIG. 3, the first region 36 may comprise at least two projections (or "raised elements") that are disposed at a greater elevation outward from the web-facing surface 32 of the forming guide 22 than other portions of the forming guide. The projections are spaced apart from each other in the cross-machine direction. The first region 36 of the web-facing surface 32 further comprise at least one depression in the web-facing surface 32 that is located between the projections. The first region 36 may comprise a plurality of alternating and adjacent projections and depressions in the web-facing surface 32. The projections have a length and a width. The length of the projections is longer than the width of the projections. In the example of the forming guide 22 shown in FIG. 3, the projections are in the form of ridges 42 and the depressions are in the form of valleys 44 having their longer (or length) dimensions that are generally oriented in the machine direction. These may be referred to as a first group of ridges and valleys. The first group of ridges 42 and valleys 44 are located at least adjacent to the downstream end 30 of the forming guide 22.

The triangular plan view field formed by the first region 36 in the embodiment shown in FIG. 3 may be considered to have a base, B1, and a peak, P1. The base B1 of the triangular field is located adjacent the downstream portion of the forming guide 22, and the peak P1 of the triangular field is located adjacent the upstream portion of the forming guide. It should be understood, however, that the configuration of the first region 36 is not limited to a generally triangular configuration, and numerous other configurations are possible. In addition, when it is said that the ridges 42 and valleys 44 are generally oriented in the machine direction, this includes orientations that are in the machine direction, as well as those that are at an angle A1 of less than or equal to about 45°, alternatively between about 1 and 10°, relative to the machine direction.

The second region 38 may comprise at least two second region projections (or "raised elements") that are disposed at a greater elevation outward from the web-facing surface 32 of the forming guide 22 than other portions of the forming guide in the second region. These second region projections are spaced apart from each other in the machine direction. The second region 38 of the web-facing surface 32 further comprise at least one depression in the web-facing surface 32 that is located between the projections. The web-facing surface 32 of the second region 38 may comprise a plurality of alternating and adjacent projections and depressions. The second region projections have a length and a width. The length of the second region projections is longer than the width of the second region projections. In the example of the forming guide 22 shown in FIG. 3, the projections are in the form of ridges and the depressions are in the form of valleys having their longer (or length) dimensions that are generally oriented in the cross-machine direction. These may be referred to as a second group of ridges 46 and valleys 48. The second group of ridges 46 and valleys 48 are located at least adjacent to the upstream end 28 of the forming guide 22. In some embodiments, the cross-sections of the generally cross-machine direction-oriented projections and depressions in the second region 38 viewed in the cross-machine direction may, be the same as, or similar to the cross-sections of the MD-oriented ridges and valleys in the first region when the latter are viewed in the MD. In other embodiments, the cross-sections of these elements of the first and second regions 36 and 38 may differ.

The triangular plan view field formed by the second region 38 may be considered to have a base, B2, and a peak, P2. The base B2 of the triangular field is located adjacent the upstream portion of the forming guide, and the peak P2 of the triangular field is located adjacent the downstream portion of the forming guide. It should be understood, however, that the configuration of the second region 38 is not limited to a generally triangular configuration, and numerous other configurations are possible. In addition, when it is said that the ridges 46 and valleys 48 in the second region 38 are "generally oriented" in the cross-machine direction, this includes orientations that run at angles A2 between about 0°-45° relative to the cross-machine direction. Angles that run in the cross-machine direction (that is, at 90° relative to the machine direction) are desirable since other angles tend to drag on the web and cause the web to move to the side. This can create the need for devices to be added to the forming apparatus in order to "track" the web.

Figure 4:
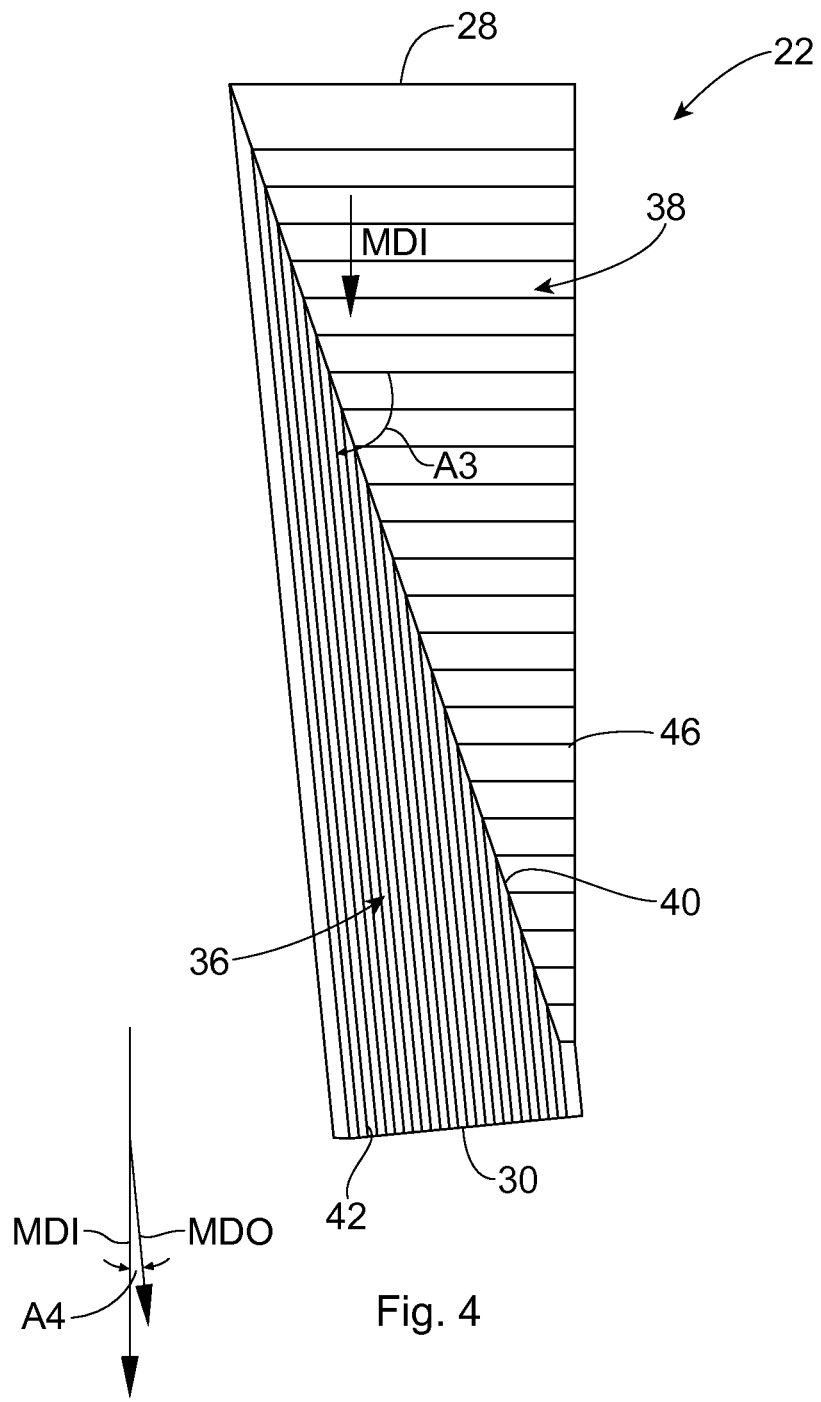
FIG. 4 is a plan view of another example of a forming guide.

As shown in FIG. 4, the projections in the second region 38 may be oriented so that their length dimension is at an acute (less than 90°) angle A3 relative to the generally machine direction-oriented ridges 42 in the first region 36. Suitable angles, A3, range from between about 45° and about 89°, alternatively between about 70° and about 89°. Lesser angles can also be used; however, this will change the depth to which pleats are formed. At the boundary 40, the projections in the second region 38 align with the ridges 42 in the first region 36, and the depressions in the second region 38 align with the valleys 44 in the first region 36. The projections in the second region 38 may, or may not, abut with the ridges 42 in the first region 36. In the example shown, the projections in the second region (second group of ridges 46) abut with the ridges 42 along the diagonal boundary 40.

The orientation of the web can also be changed as it passes over the forming guide 22. The orientation of web is based on the orientation of the edges of web. The web can have an incoming machine direction orientation MDI, and an outgoing machine direction orientation MDO that are typically different. For instance, FIG. 4 shows that the second region projections, such as ridges 46, can be set at an angle that runs at about 90° relative to the incoming machine direction orientation MDI (that is, the ridges 46 run in the cross-machine direction), and the web (not shown) can have an outgoing machine direction orientation MDO, that is at an angle A4 that differs from the incoming machine direction orientation MDI. In this case, the angle A3 is complementary to the outgoing machine direction orientation MDO angle A4 (both angles combine to form a 90° angle).

Figure 5:
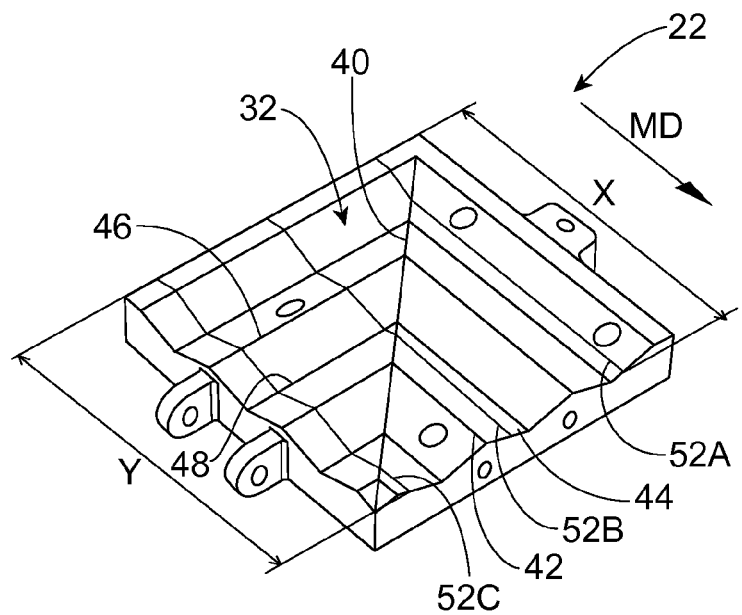
FIG. 5 is a perspective view of a portion of a forming guide showing the concept of equal path length forming.

As shown in FIG. 5, the web-facing surface 32 of the forming guide 22 may be configured to provide a substantially equal path length across the width of the web-facing surface 32. The path length is measured through a series of points, each point being equidistant from one side edge of a web traveling over the forming guide 22 in the machine direction. For example, FIG. 5 shows three parallel paths 52A, 52B, and 52C that follow the contour of the web-facing surface 32 of the forming guide 22. If the wavy lines representing these paths (imagine inextensible strings) were lifted out of the surface of the forming guide 22 and straightened out to lie in the same plane, they would each be of the same length. It should also be noted that whenever a segment of one line is on the same plane as a segment of another line (such as at the places marked by the double hash lines), they are parallel in that plane and also parallel to the edge of the web. As shown in FIG. 5, the straight planar distance measured from one end of the line 52C to the other end of the line 52C is designated Y, and the straight planar distance from one end of the line 52A to the other end of the line 52A is designated X.

Figure 5A:
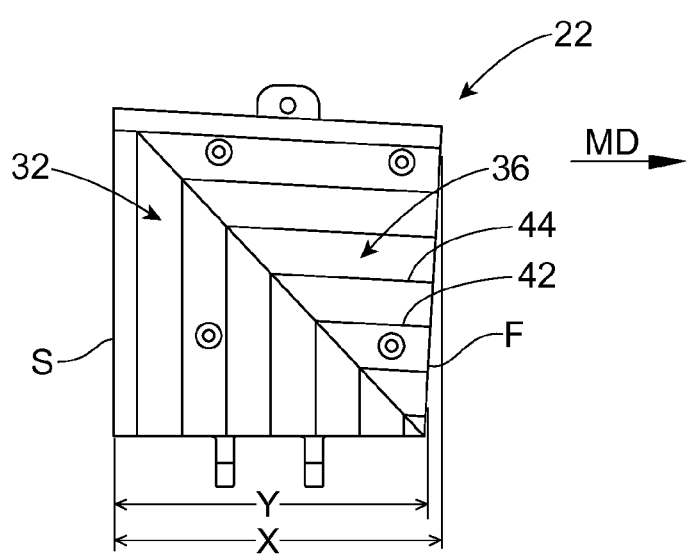
FIG. 5A is a plan view of the portion of a forming guide shown in FIG. 5.

In this case, as shown best in FIG. 5A, distance Y is shorter than distance X. The upstream ends of X and Y have a common machine direction starting position (or "starting line") S. The downstream ends have a common machine direction finishing position. However, the finishing positions lie along a line (a "finish line"), F, that is at an angle to the "starting line" S. The finish line F is perpendicular to the ridges 42 and grooves 44 in the downstream region 36 and to the edges of a web passing over the forming guide 22. Therefore, although the line 52C has more bends in it, when the two lines 52A and 52C are straightened out, they have the same straight length.

This equal path-length web-facing surface 32 provides the web with constant strain across the (cross-machine direction) width of the web, promoting even distribution of material in all depressions. The web, thus, also has an equal surface path length therein. This ensures that some portions of the web are not stretched/strained more than other portions of the web. This also ensures that the web remains relatively tight against the forming guide 22 and reduces bagginess that would lead to wrinkles in the web.

As shown in FIG. 3, in order to assist in making a web at least partially follow the shape of the forming guide 22, a mating component 24 can be positioned in a face-to-face relationship with the forming guide 22. The mating component 24 is shown in an open, non-mating position in FIG. 3 for purposes of illustration. FIG. 3 shows the forming apparatus 20 arranged with hinges so that the forming guide 22 and mating component 24 can be opened for cleaning. The mating component 24 has a shaped web-facing surface that mates with the web-facing surface 32 of the forming guide 22. The mating component 24 can have any, or all, of the elements that are found on the forming guide 22. Thus, the mating component 24 can comprise two side edges 56, an upstream end 58, a downstream end 60, a web-facing surface 62, an opposing surface 64, a first region 66, a second region 68, a boundary 70, a first set of ridges 72 and valleys 74 in the first region, and a second set of ridges 76 and valleys 78 in the second region. The mating component 24 may have any suitable web-facing surface configuration that is capable of mating with the web-facing surface 32 of the forming guide 22. In the example shown, the mating component 24 has a surface configuration that comprises a similar pattern of ridges and valleys as that of the forming guide 22, but is offset so that the ridges 72 of the mating component align with the valleys 44 of the forming guide 22, and the ridges 42 of the forming guide 22 align with the valleys 74 of the mating component 24.

As shown in FIG. 6, when in use, the two mating shaped surfaces 32 and 62 are positioned slightly apart in order to force the web 10 to at least partially follow the contours of the shaped surfaces. The two mating shaped surfaces 32 and 62 can be spaced apart any suitable distance to form a gap, G, therebetween. The gap G can, for example, be about 1 mm. The web 10 passes between this gap such that the peaks of the shaped surfaces push the web 10 toward the valleys of the opposite shaped surface, forcing the web 10 into the desired shape.

The web 10 can take the general shape of the shaped surfaces. When it is said that the web 10 can take the general shape of the shape of the shaped surfaces 32 and 62, as shown in FIG. 6, the web 10 may, but need not conform exactly to the configuration of the shaped surfaces 32 and 62. For example, as shown in FIG. 6, the web 10 may only contact the ridges (or other raised elements) 42 and 72, and may not extend into the valleys 44 and 74. Thus, the web 10 can be considered to be at least partially in contact with the web-facing surface of the forming guide. When the web 10 is moved through the forming apparatus 20, it can maintain very nearly equal strain throughout. In at least some cases, the flat incoming web can be folded along the peaks and valleys of the forming apparatus as shown and all portions of the web between the peaks may maintain their original shape. In such cases, the web may be substantially free from stretching between fold lines.

Figure 7:
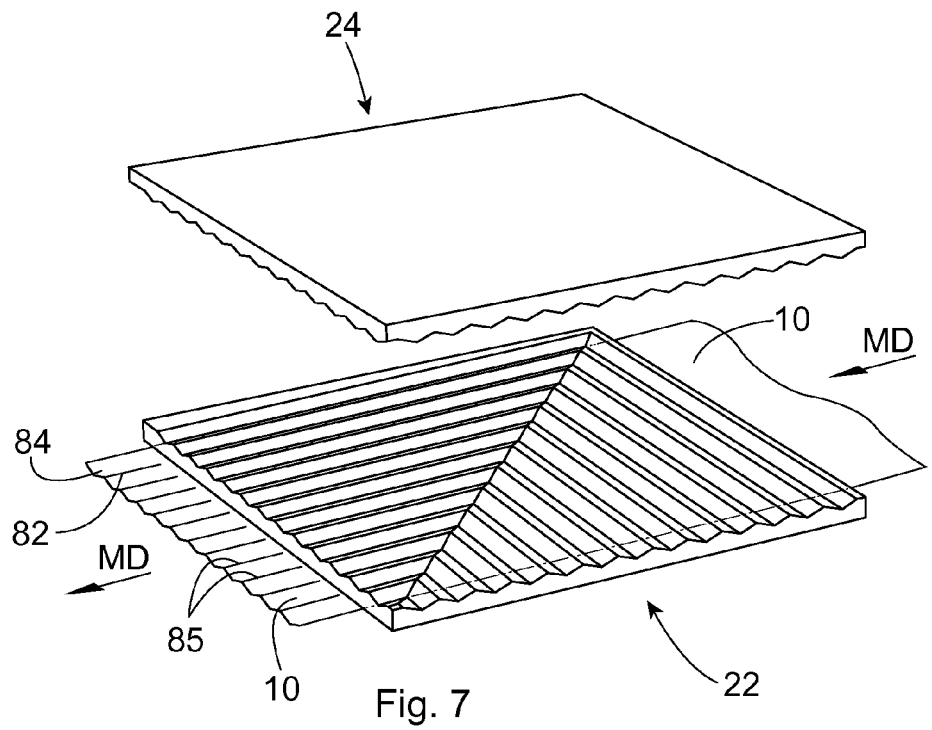
FIG. 7 is a fragmented perspective view of the configuration of a web before and after passing through the forming apparatus.

In operation, the web 10 will typically have a substantially planar (flat) incoming configuration. The web 10 first passes through a series of generally CD-oriented pleat-forming shapes connected to generally MD-oriented pleat-forming shapes. Passing the web 10 through the forming apparatus 20 causes the web 10 to first take the general configuration of the web-facing surface of the second region 38, and then for machine direction-oriented pleats to be formed progressively in the cross-machine direction as the web 10 proceeds downstream. As shown in FIG. 6, all of the pleat peaks may lie in the plane of the flat incoming section of the web. All pleat valleys may lie in a common plane parallel to and at a distance "DP" (depth of pleat) below the plane of the peaks. FIG. 7 shows one example of what a web 10 may look like when it enters the forming apparatus 20, and after it has passed through the forming apparatus. The web 10 has a plurality of machine-direction oriented ridges 82 and valleys 84 that have MD-oriented fold lines 85 defining the same.

Figure 8:
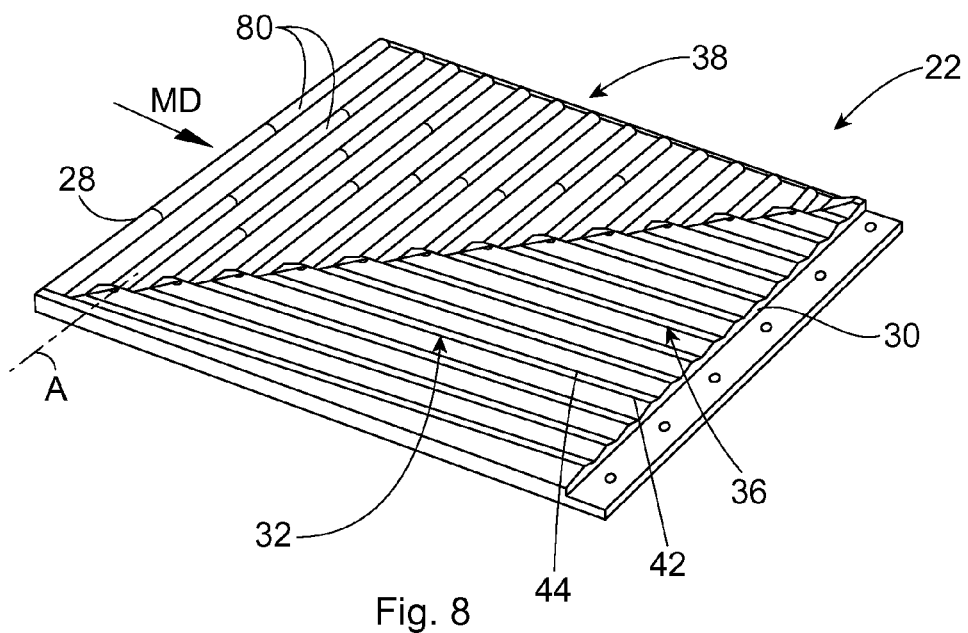
FIG. 8 is a perspective view of an example of a forming guide comprising a second region with rollers.

Numerous alternative embodiments of the forming apparatus 20 and method are possible. A non-limiting number of these are described below. FIG. 8 shows a second example of a forming guide 22. In this case, the forming guide 22 comprises a second region 38 in which the ridges on the previously shown forming guide (which are oriented generally in the cross-machine direction) are replaced with rotatable idler rollers 80. This greatly reduces the friction developed on the web 10 compared with a web passing through a fixed surface forming apparatus. Although the rollers 80 can be oriented at an angle of less than 90 degrees relative to the machine direction, it is desirable that rollers 80 are oriented with their axis of rotation, A, at an angle of 90° relative to the incoming machine direction MDI.

In other embodiments, rather than having a forming apparatus 20 that comprises a forming guide 22 and a mating component, some other mechanism can be used to force the web 10 to follow the shape of the forming guide 22. For example, air pressure can be applied to the top of the web to force the web 10 to follow the shape of the forming guide 22. In other embodiments, rather than applying air pressure on top of the web, the forming guide 22 can have holes therein, and a vacuum can be drawn through the holes in order to hold the web in place on the forming guide 22.

The methods for pleating or otherwise shaping a web described herein can be used for a variety of purposes including, but not limited to: in the manufacture of diapers and other absorbent articles, filters, window shades, and other articles, and as described below, in the formation of packages.

Use of the Forming Apparatus to Make Unit Dose Packages (1) Unit Dose Packages

In some cases, the method and apparatus may be used in the formation, filling, and sealing of unit dose packages for consumer products. Although the method and apparatus is illustrated herein in the context of producing unit dose packages, it should be understood that this is merely one example of the use of the method and apparatus. The method and apparatus can be used in any suitable process.

The unit dose package formed by the method and apparatus can be in any suitable configuration. The contents of the package can be in any suitable form including, but not limited to solids, liquids, pastes, and powders. The term "fluid" may be used herein to include both liquids and pastes.

In certain embodiments, the unit dose packages comprise sachets that are filled with products which may include personal care products or household care products including, but not limited to: shampoo, hair conditioners, hair colorants (dyes and/or developers), laundry detergents, fabric softeners, dishwashing detergents, and tooth paste. The sachets can contain other types of products including, but not limited to food products such as ketchup, mustard, mayonnaise, and orange juice. Such sachets are typically relatively thin and flat, and in some cases, are provided with water vapor barrier properties to prevent water loss from the product in the package over time, or water intrusion into the product from outside the package.

Figure 9:
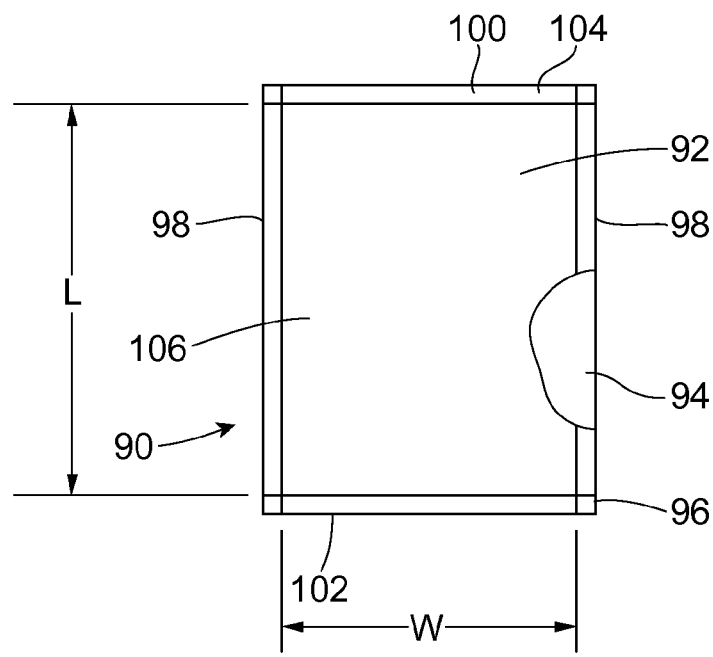
FIG. 9 is a schematic front view of one embodiment of a sachet.

FIG. 9 shows one non-limiting example of a package that is in the form of a prior art sachet 90. The sachet 90 has a front 92, a back 94, a periphery 96, two sides 98, a top 100, and a bottom 102. The sachet 90 further has a seal 104 around the periphery. The sachet may be in any suitable configuration including, but not limited to the rectangular shape shown. The sachet may have any suitable dimensions. In one embodiment, the sachet is 48 mm×70 mm, and has a sealed area that is 5 mm in width around all four sides. The dimensions of the pocket 106 inside the sachet (width W and length L) are 38 mm×60 mm.

The package, such as sachet 90, can be made of any suitable materials. Suitable package materials include films, and woven or nonwoven materials (in cases where the sachet contains a solid product), or laminates of any of the foregoing. If desired, the package material can comprise a liquid and/or vapor barrier in the form of a layer or a coating. The package materials may be comprised of non-water soluble materials, or for some uses, water soluble materials. The various portions of the sachet (or other type of package) can all be made of the same materials. In other embodiments, different portions of the package can be made of different materials. In one embodiment, the sachet 90 is made of two pieces of the same film that form the front 92 and back 94 of the sachet. The film can be any suitable type of film including single layer films and laminates.

In one embodiment, the package material is a laminate comprising the following three layers: a 9 micron thick polyethylene terephthalate (PET) film; an 18 micron thick vacuum metalized bi-axially oriented polypropylene (VM BOPP) vapor barrier film; and a 30-50 micron thick polyethylene (PE) film. The PET and PE layers are adhered to the VM BOPP film by adhesives. In this film, the PET layer will comprise the outside surface of the sachet, and the polyethylene layer will comprise a sealing layer on the inside of the sachet. The water vapor barrier properties for this film are important to prevent water loss from the product inside the sachet over time before it is used by the consumer. The film has a target water vapor transmission rate of less than or equal to about 0.4 grams/m$^2$/day. The average machine direction modulus of this laminate film is about 63,000 N/m, and the average cross-machine direction modulus is about 75,000 N/m.

Figure 10:
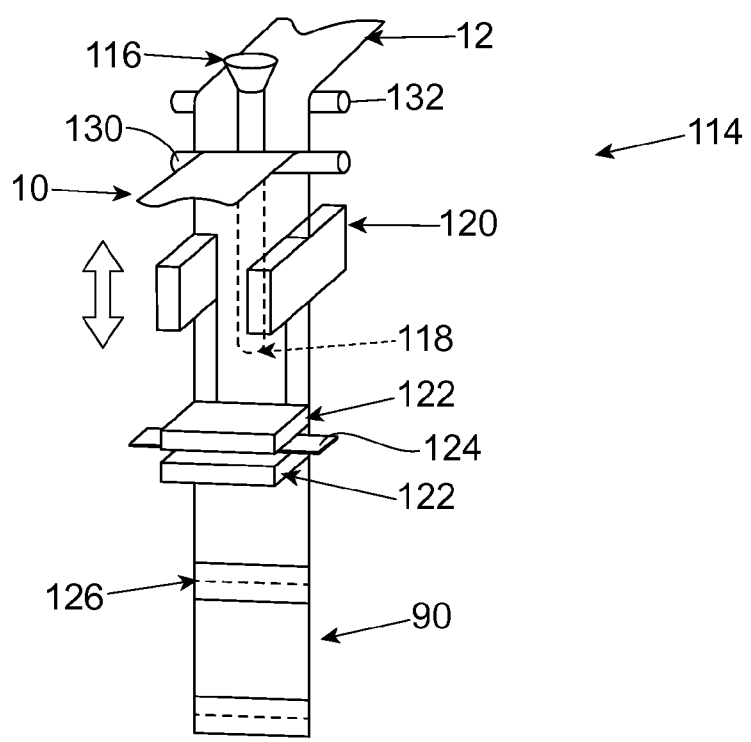
FIG. 10 is a schematic perspective view of a single lane vertical forming, filling, and sealing process.

FIG. 10 shows a vertical form, fill, and seal (VFFS) process and apparatus 114 for making sachets. As shown in FIG. 10, two webs of material 10 and 12 for forming the sachets are brought into the apparatus, and are fed into the process in a vertically downward direction. A filling tube 116 is disposed between the webs 10 and 12 when the webs pass through a dispensing zone. A nozzle 118 is located at the end or tip of the filling tube 116 (the view of the nozzle 118 is obstructed by the second web 10. Vertical seals are formed along the sides of the webs 10 and 12 by vertical sealing mechanisms 120. A cross (or cross-machine direction) sealing mechanism 122 is located below the filling nozzle 118. The cross sealing mechanism 122 forms the seal that is located at the top of one sachet and the bottom of the next sachet. The nozzle 118 may dispense a product such as a liquid (or paste) product in between webs 10 and 12 after the initial horizontal seal is formed at the bottom of the package. A perforation or cutting mechanism 124 may be located between the upper and lower portions of the cross sealing mechanism 122 (as shown in FIG. 10), or it may be located below the cross sealing mechanism 122. The perforation mechanism 124 forms perforations 126 through the seal formed by the cross sealing mechanism 122. A finished package or sachet 90 is shown at the bottom of FIG. 10.

The simplified version of the apparatus 114 shown in FIG. 10 is only a single lane (one package width) wide. It is known to provide such apparatuses with multiple side-by-side lanes. Currently, in such apparatuses, the webs 10 and 12 will typically originate from a single roll of web material. The web taken from the initial roll of web material is slit in half, inverted over two turn bars, and run over idler rolls 130 and 132. As shown in FIG. 10, the webs 10 and 12 are brought into the apparatus in a substantially flat configuration. That is, the webs 10 and 12 are generally planar across their widths. After turning around the idler rolls 130 and 132, the first and second webs of material 10 and 12 are generally parallel to each other with their sealing surfaces facing each other. The first and second webs of material 10 and 12 are generally parallel to each other in the region of the nozzle(s) 118. Current processes typically rely on the webs of material 10 and 12 spreading apart when they pass around the nozzles 118 in order to create a space into which the product is dispensed by the nozzles 118.

When the webs are formed to create a space for the nozzles and product in this manner, it can lead to variable machine direction tension across the width of the webs. For example, the outside edges of the webs 10 and 12 are tighter than the centerline of the webs because of the reduced web width of the formed webs. In addition, if there are multiple side-by-side lanes, within each lane the webs are tighter in the seal bar 120 contact area than around the nozzles 118 due to the longer path length the webs take. This can lead to issues with lane to lane web forming-instability as a function of machine direction tension variation across the width of the web. For example, the web in the center of the machine where it is wrapped around the nozzles is the shortest web path length across the width of the web, thereby making the center lanes the most unstable for forming. This may lead to various problems. For instance, the configuration taken by the front and back webs may not be the same in a given lane. Ultimately, this causes a greater chance for wrinkles to form in the cross-machine direction seals of a sachet. In addition, if there is writing on the sachets, wrinkles may also disrupt the text making it difficult to read.

(2) Forming the Web(s)

Figure 11:
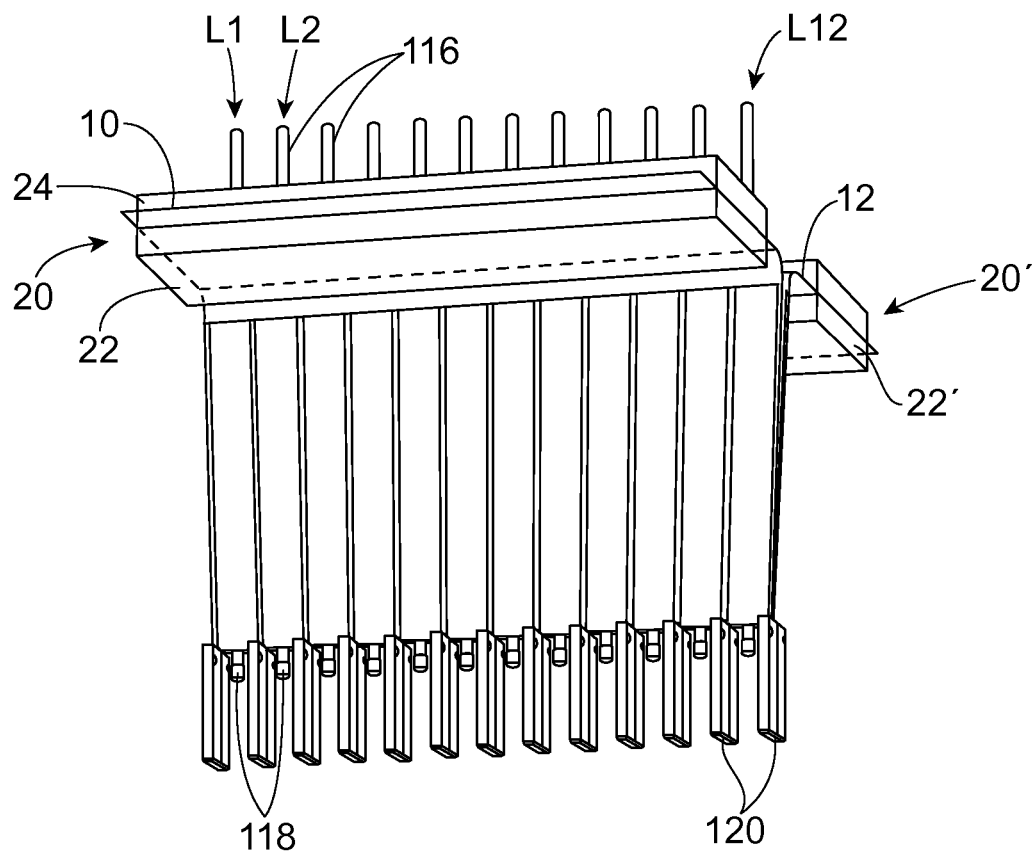
FIG. 11 is a schematic perspective view of a multiple lane vertical forming, filling, and sealing process.

FIG. 11 shows an apparatus having multiple lanes L1, L2, . . . to L12 in the cross-machine direction. This enables side-by-side rows of sachets to be produced from a single web of film (that is, a single first web of material 10 and a single second web of material 12). The VFFS apparatus described herein can comprise any suitable number of multiple lanes, from two to twelve, or more. The method of making unit dose packages described herein provides a forming apparatus 20 for at least one of the webs 10 and 12. However, it is typically desirable to provide a forming apparatus for both of the webs 10 and 12. In such case, each of the webs is run through one of the forming apparatuses 20 and 20' of the type described herein. The forming apparatuses 20 and 20' may be oriented at any suitable angle(s), (that is, in any suitable orientation) relative to the horizontal and vertical directions. Suitable orientations can range from substantially vertical to substantially horizontal. In the version of the process shown in FIG. 11, the forming apparatuses 20 and 20' are oriented substantially horizontally, with the webs 10 and 12 being fed into the process from opposite directions. The webs 10 and 12 are brought closer together as they pass through the forming apparatuses 20 and 20', and are turned vertically downward and fed into the filling zone around filling tubes 116 with the nozzles 118 thereon. Vertical sealing mechanisms 120 are shown at the bottom of the figure.

The forming apparatuses 20 and 20' are used to form the webs 10 and 12 into more consistent shaped configuration instead of using the nozzles as the forming tools. The risk of leaks and defects may be greatly reduced using this technology. The forming apparatuses 20 and 20' comprise forming guides 22 (and 22') as described above. The forming guides 22 and 22' have surfaces that are configured to space at least a portion of the webs 10 and 12 away from the nozzles. The forming guides 22 and 22' may be shaped to maintain even strain on the web. The forming guides 22 and 22' can be used to form the webs 10 and 12 into any desirable shape including, but not limited to a pleated configuration.

Figure 12:
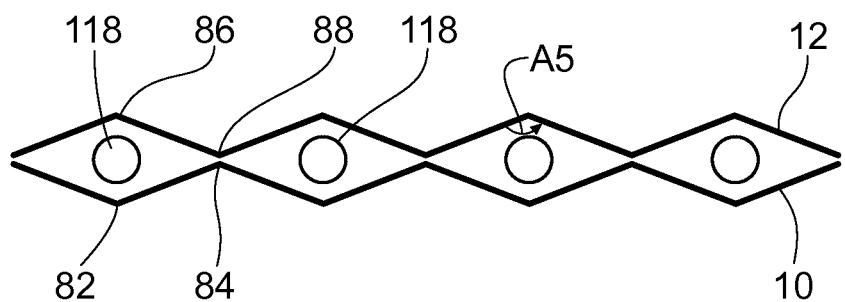
FIG. 12 is a schematic cross-sectional view of a portion of the webs surrounding the nozzles of the multiple lane vertical forming, filling, and sealing apparatus.

FIG. 12 shows one example of the cross-section of the webs 10 and 12 in the filling zone surrounding the nozzles 118. As shown in FIG. 12, the bottoms of the valleys and the peaks of the pleats are defined by temporary fold lines running in the machine direction. The portions of the webs on either side of the temporary fold lines may form any suitable angle, A5, with each other when the webs are viewed looking in the machine direction. Suitable angles A5 include, but are not limited to between about 45° (or less) and less than about 180°. The fold lines of the webs are aligned. That is, the fold lines of web 10 are aligned with the fold lines of web 12. The folded portions are aligned so that portions of the pleats oppositely disposed on each side of the nozzles 118 create space for the nozzles. In the case of forming webs for unit dose package, it may be desirable that the pleats are only temporarily formed and that no creases are formed in the webs. The pleats may flatten out after such temporarily pleated portions of the webs move beyond the nozzle(s). It is understood that FIG. 12 shows only one possible configuration of the webs 10 and 12, and that numerous other configurations are possible. For example, though less desirable, some of the benefits of the present invention may be realized if only one of the webs 10 and 12 is formed or pleated.

The method for transforming a web from a flat configuration (as it comes from a roll) to a package, such as a sachet is as follows. In a multi-lane, vertical form, fill and seal sachet making process, two webs 10 and 12 are brought together from opposite sides of a row of fill tubes 116. As each web 10 and 12 passes through the forming apparatuses 20 and 20', the webs generally each take the shape of a pleated web with fold lines running in the machine direction. The webs maintain this shape when they pass adjacent to the nozzles 118 and between the vertical seal bars 120. The machine direction seal forming device may be in the form of machine direction (MD)-oriented heated elements (bars) 120 that are located between adjacent lanes and also laterally outside the first and last lanes. The sealant layers of the webs are heated to their melting point to heat seal the same together. Portions of the webs are sealed together to join the webs 10 and 12 in machine-direction regions located between the fill tubes 116. This produces a tube-like web structure surrounding each fill tube 116 and its associated nozzle 118. The machine direction seals will form the side seals on the sachets. The tube-like web structure is later sealed with horizontally-oriented seals, filled with product, and sealed again with horizontal seals to form the sachets 90.

In a vertical form, fill and seal process, it may also be desirable to reduce the length of the fill tubes 116 since long, slender fill tubes are prone to damage and instability due to machine vibration. Long fill tubes can also make the height of the VFFS machine too large. Instability in the fill tubes in prior art processes can result in more web material to be provided on the front of a sachet than for the back of the sachet, or vice versa, causing wrinkles to form in the seal areas. As shown in FIG. 11, one way to reduce the length of the fill tubes 116 is to form the webs 10 and 12 into the desired pleated configuration on a horizontal plane. The pleated webs 10 and 12 can then be passed over a turning device to turn the formed (e.g., pleated) webs into a vertically-traveling orientation for the filling process. This eliminates most of the vertical space that forming would have taken if the forming or pleating of the webs 10 and 12 had been done in a vertical orientation.

(3) The Turning Guide

One challenge with turning the webs 10 and 12 is in re-directing a pleated web over a turning device. To simply pass a pleated web over a conventional idler roll would buckle the structure of the pleated web, destroying its desired pleated form. Applicants have developed a better approach than attempting to turn pleated webs around idler rolls. This approach passes at least one of the webs, and typically each of the webs 10 and 12, over a fixed, specially shaped surface, such as the turning guide 140 shown in FIG. 13. The webs 10 and 12 will typically be brought into the VFFS apparatus from opposite directions as shown in FIG. 11. The webs 10 and 12 are each formed as described herein, and the webs 10 and 12 are then turned vertically downward over its own turning guide (not shown in FIG. 11). The turning guide 140 shown in FIG. 13 turns the pleated web an angle of 45 degrees downward.

The turning guide 140 allows the pleated web(s) to be bent out of the folded configuration of the pleated web(s). The pleated web comprises pleats having fold lines that are typically oriented in the machine direction. The pleated web is a three dimensional structure in which the fold lines of the ridges typically lie in one plane, and the fold lines of the valleys typically line in another plane. These planes are typically parallel. The pleated web can be considered to have a neutral axis or pitch line. As shown in FIG. 13, the turning guide 140 allows the pleated web 10 to be bent in the machine direction out of these parallel planes (that is, the pleated web is bent in the machine direction out of the general plane of the pleated web).

The turning guide 140 has an upstream end, a downstream end, a web-facing surface 142 having a machine direction dimension MDD, a width W1 oriented in the cross-machine direction, and at least two sections 144 and 146 disposed in the machine direction. As shown in FIG. 13, a first section 144 of said web-contacting surface 142 of the turning guide 140 comprises a first set of alternating machine direction ridges 148 and valleys 150 across the width of the turning guide 140. A second section 146 of the web-contacting surface 142 is a downward sloping section that comprises a second set of alternating machine direction ridges 152 and valleys 154 across the width of the turning guide 140. The turning guide 140 is configured so that the ridges 148 of the first section 144 are substantially aligned with the valleys 154 of the second section 146, and the valleys 150 of the first section 144 are substantially aligned with the ridges 152 of the second section 146. In other words, the turning guide 140 has a web-contacting surface 142 shaped so that a "valley" of a pleat-forming surface on the horizontal portion becomes a "peak" of a pleat-forming surface on the downward sloping section, to ensure that the turning process follows the principles of equal path length folding.

When the turning guide 140 is viewed from the side looking in a cross-machine direction, the ridges 148 of the first set of alternating ridges and valleys define a first plane, and the ridges 152 on the second set of ridges and valleys define a second plane, and the second plane is angled away from the first plane in a direction away from the portion of the web-facing surface 142 defined by the first set of alternating ridges and valleys. When the pleated web is passed over the web-facing surface 142 of the turning guide 140, the pleated web can be bent in the machine direction while maintaining the pleats in the web.

To achieve a 90 degree downward turn, the downward sloping portion of the web-facing surface of the turning guide 140 could simply be made to be vertical, but this requires that the web 10 turn and break over fairly sharp corners, which may damage the web. To lessen the sharp corners that the web must break over, the turning guide 140 can be shaped to break over a series of lesser angles, such as three 30 degree breaks as shown in FIG. 14. With each 30 degree break, the valleys become peaks, and the peaks become valleys, preserving the equal path length nature of the web. It may appear in FIG. 14 that a valley on top of the forming guide still remains a valley after the first 30 degree break, but in fact the valley does become a peak. Such a peak can be thought of as a peak of zero machine direction length. Minimizing the peak length keeps the turning guide 140 as compact as possible.

Numerous alternative embodiments of the turning guide 140 are possible, a non-limiting number of which are as follows. In some embodiments, the turning guide 140 can have a mating component to hold the pleated web against the web-facing surface of the turning guide 140. In other embodiments, the turning guide 140 need not have a mating component. In other embodiments, air jets and/or vacuum can be used to hold the web against the turning guide 140.

(4) Sealing Together Moving Webs Having Portions which are Non-Planar.

When multiple lanes of sachets are formed simultaneously from one web, the webs 10 and 12 can take on a cross-sectional configuration such as that shown in FIG. 12. This is an example of the webs 10 and 12 in the dispensing zone before the heat sealing cross-machine sealing bars clamp the webs to form the cross-machine direction (CD) seals. One challenge that occurs with clamping the webs 10 and 12 to make the CD seals is that wrinkles can be formed in the portions of the webs to be sealed. As shown in the drawing sequence FIGS. 15A to 15D, when the seal bars 122 and 122' come together, the combined web is unable to spread horizontally to form a flat structure for sealing. FIGS. 15A-15C show the sequence of the sealing bars 122 and 122' coming together. FIG. 15D shows the wrinkles in the webs that may be formed after the sealing bars 122 and 122' move back apart.

An improved method and apparatus has, therefore, been developed for sealing two moving webs of material together which have portions which are non-planar. The non-planar portions of the web(s) of material 10 and 12 are formed across the width of the web(s) of material. The non-planar portions can include, but are not limited to: folds, pleats, rugosities, and wrinkles in the webs(s). The web(s) with the non-planar portions may be defined by fold lines that are generally oriented in the machine direction.

The method and apparatus for sealing two moving webs of material together can be used in any suitable process in which there are moving webs of material having portions which are non-planar. Such processes include, but are not limited to, conventional prior art vertical form, fill, and sealing processes that use the nozzles to shape the webs, and, of course, the improved processes described herein which use forming apparatuses to shape the webs around the nozzles.

The apparatus for sealing two moving webs of material together comprises a first component 160 and an opposing second component 162. As shown in FIGS. 16A to 16C, the first and second components 160 and 162 can comprise the cross-machine direction sealing bars 122 and 122' (or 122' and 122). That is, the first and second components can be the same as the cross-machine direction sealing bars, or the cross machine direction sealing bars can comprise a portion of the first and second components 160 and 162. In other embodiments, the first and second components 160 and 162 can comprise separate elements from the cross-machine direction sealing bars 122 and 122'.

If the first and second components 160 and 162 are separate from the cross-machine direction sealing mechanism, at least a portion of the cross-machine direction sealing mechanism can be located upstream and/or downstream of the first and second components 160 and 162. If the cross-machine direction sealing mechanism comprises cross-machine direction seal-forming elements that are spaced apart from each other in the machine direction, at least a portion of the first and second components 160 and 162 can be located between such cross-machine direction seal-forming elements. Regardless of their location in the apparatus, typically, at least one of the first component and the second component 160 and 162 are movable toward the each other.

In the embodiment shown in FIGS. 16A to 16C, the first component 160 has a web-contacting surface 164 with at least one recess 166 therein. There can be any suitable number of recesses from one to two or more. The recess(es) 166 can be in any suitable configuration, provided that they are suitable to perform the desired function. For example, in making sachets, it may be desirable for the recesses 166 to be narrow enough so that when portions of the webs are accumulated therein, the machine direction seal width will be greater than the sum or the width of the recess 166 plus the amount of film accumulation by about at least 20% to 30%. This will ensure that the cross-machine direction seals intersect with the machine direction seals so that the finished sachets will be sealed around their entire periphery. Suitable recess configurations include, but are not limited to machine-direction oriented grooves and machine-direction oriented valleys. The opposing second component 162 has a web-contacting surface 168 that faces the first component 160. The second component 162 comprises at least one projection, which may be in the form of a projecting element 170 that mates with the recess 166 in the web-contacting surface 164 of the first component 160.

The moving webs of material 10 and 12 are fed between the first and second components 160 and 162. A sealing mechanism 122 for sealing portions of the moving webs of material together (if not part of the first and second components) is located proximate the first and second components 160 and 162. The sealing mechanism 122 can be upstream of the first and second components 160 and 162, downstream of the first and second components 160 and 162, or there can be sealing mechanisms, or portions thereof, that are both upstream and downstream of the first and second components 160 and 162. In the embodiment shown in FIGS. 16A to 16C, the sealing mechanism is part of the first and second components 160 and 162, and is located on the surfaces of the first and second components.

As shown in FIGS. 16A to 16C, the projecting elements 170 on the web-facing surface 168 of the second component 162 can be retractable and spring-loaded to push sections of the webs into recesses (e.g., grooves) 166 prior to sealing. The retractable, spring-loaded projecting elements 170 are formed by joining the projecting elements 170 to springs 172 that are located in recesses 174 in the web-facing surface 168 of the second component 162. By adding spring-loaded features which push sections of the webs into grooves 166 prior to sealing, the excess portions of the webs in the areas to be sealed can be stretched out before the seal bars make contact with the webs.

The sequence of events is shown in FIGS. 16A to 16C. FIG. 16A shows the first and second components with sealing bars thereon starting to come together to form a cross-machine direction seal between the sachets to be formed. As shown in FIG. 16A, two sachets are being formed. In this particular embodiment, the recesses 166 and the projecting elements 170 are aligned in the space between the formed portions of the webs 10 and 12. (In other embodiments, this need not be necessary.) The projecting elements 170 extend outward from the web-contacting surface 168 of the second component 162 toward the recesses 166. FIG. 16B shows the first and second components 160 and 162 after they have moved together close enough that the projecting elements 170 push the webs into the recesses 166. As shown by the arrows around the projecting elements 170, this causes portions of the webs adjacent to the projecting elements 170 and recesses 166 to be pulled toward the projecting elements 170 and flattened out. FIG. 16C shows the first and second components 160 and 162 at the stage in which their faces are brought together with the webs therebetween in order to form the cross-machine direction seal. At this stage, the spring-loaded projecting elements 170 retract into recesses 174 in the face of the second component 162.

The steps of: (1) forcing at least portions of the webs into at least one recess 166 in the web-contacting surface of the first component 160 in order to stretch and flatten at least some of the non-planar portions of the webs; and (2) sealing portions of the first and second webs together across the flattened non-planar portions can occur in any order, such as with step (1) taking place before step (2), or with steps (1) and (2) taking place simultaneously, provided that the step (1) of forcing at least portions of the webs into at least one recess 166 in the web-contacting surface of the first component 160 occurs before the seal formed in sealing step has finished setting.

Figure 17:
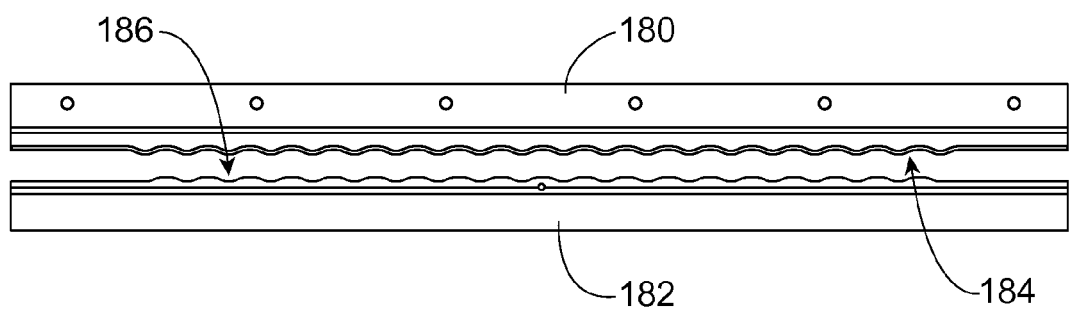
FIG. 17 is a plan view (looking in the direction that the webs will travel) of an alternative mechanism for forming cross-machine direction seals.

FIG. 17 shows an alternative embodiment of an apparatus for forming the cross-machine direction seals. In FIG. 17, the apparatus comprises first and second components 180 and 182. Each of the components 180 and 182 has a three-dimensional sealing surface 184 and 186, respectively, having a plurality of projections and a plurality of recesses therein. The projections and recesses on the first and second components 180 and 182 are complementary, and at least some of the opposing projections and recesses mate with one another. The mating projections and recesses can be in any suitable configuration. In the embodiment shown, the sealing surfaces 184 and 186 of the first and second components 180 and 182 have a sinusoidal wave configuration wherein the crests of the waves extend in the longitudinal direction. When the webs 10 and 12 (not shown) are in their pleated configuration, before the cross-machine direction seal is made, the distance from one edge of each web to the opposite edge of each web is less than the width of the flat web. In order to avoid having extra material in some places between the sealing components that could form a wrinkle, the sealing surfaces 184 and 186 are configured so that the cross-machine direction length of the sinusoidal path along the sealing surfaces 184 and 186 is equivalent to the width of the flat webs. There can be any suitable number of sinusoidal cycles per package (e.g., sachet) to be formed, from one to two or more. The sealing surfaces 184 and 186 can also be coated with any suitable coating.

(5) Filling the Sachets

In the case of the process of making sachets, a first cross-machine direction seal is made to form the bottom of the sachet. A product is dispensed into the open top of the sachet. The product can be dispensed after the seal is made to form the bottom of the sachet. In other embodiments, the product can be dispensed shortly before the seal is made to form the bottom of the sachet for maximum line speed (since it takes a small amount of time for the product to flow down to the seal area). The product can be dispensed with any suitable dispensing device or apparatus. Suitable devices include, but are not limited to nozzles, positive displacement pumps, and devices for dispensing solids or powders, depending on the product to be dispensed. Although the present description describes nozzles, other dispensing devices may be used instead.

The nozzles 118, and the orifices thereof, can be of any suitable type and configuration. One suitable nozzle is a Hibar Double Acting Fill Tube Assembly (⅜" ID) circular orifice positive shut off nozzle having a dispensing orifice diameter of ¼ inch (6.4 mm) available from Hibar Systems Limited of Toronto, Canada. In other embodiments, the nozzle may have multiple orifices. That is, the nozzle may be a multiple-hole or "multi-hole" nozzle. Examples of multi-hole nozzles are described in U.S. patent application Ser. No. 14/028,877 filed Sep. 17, 2013. The discharge end of the nozzle assembly and nozzle component may have any suitable configuration(s). For example, when a multi-hole nozzle is used in a vertical forming, filling and sealing process, it may be desirable for the discharge end of the multi-hole nozzle to have a flattened shape, such as a flattened diamond shape, so that it is better configured to fit in the space between the two webs of material used to form the packages.

There can be any suitable number of nozzles 118 from a single nozzle to multiple nozzles. As shown in FIG. 11, multiple nozzles can be provided in the cross-machine direction (CD) in an apparatus that comprises multiple CD lanes for forming packages. If there are multiple side-by-side lanes, there can be any suitable number of lanes including, but not limited to from two to twelve or more lanes. The multiple nozzles 118 can be substantially aligned, such as in rows in the CD.

The nozzles 118 may be stationary or movable. It is not conceded that a movable nozzle mechanism is part of the prior art. As shown in FIG. 10, if a moveable nozzle mechanism is used in a vertical forming, filling and sealing (VFFS) process, the nozzles 118 could move vertically upward and downward in the direction of the arrow. The nozzles 118 may move at a constant speed or at a variable speed during dosing. If the speed of the nozzles is variable, the movement of the nozzles may accelerate or decelerate during dosing.

It is desirable for each dose of liquid to be dispensed cleanly into the package and to substantially immediately stop the flow of liquid between doses. If the dispensing nozzle 118 drips or produces product strings between doses, the seal area between doses can be contaminated potentially causing a failure of the seal and a leaky sachet. Control of the dosing is accomplished by using a filling system or fill control system. Examples of filling (or dosing) systems with a filling control system are described in U.S. patent application Ser. Nos. 13/776,753 and 13/776,761, filed on Feb. 26, 2013.

A vertical form, fill, and sealing (VFFS) apparatus 114 such as that shown in FIG. 10 can have stationary nozzles 118 and stationary seal bars 120 and 122 while the machine is running. However, the nozzles 118 may need to be able to move up and down in the event it is desired to change the sachet length. This is a setup change that may be made when the machine is not running. In one embodiment, the MD seal bars 120 can be fixed on one side of the webs, with the surface of the fixed MD seal bars in a plane that is aligned with the centerline of the nozzle 118. The opposing MD seal bars 120 can be spring loaded up against the fixed seal bars with the webs 10 and 12 in between. The nozzles 118 may, for example, remain fixed at a nominal 20-90 mm above the initial contact point of the CD sealing bar 122, depending on sachet length, and fill volumes.

When more process adjustment is needed, the MD seal bars 120, nozzles 118, or both could move up and down in conjunction with the downward motion of the webs 10 and 12. The MD seal bars 120 could move straight up and down. Alternatively, the MD seal bars 120 could move in a semi-elliptical motion, spreading apart about 1 mm, just enough to lose contact with the webs 10 and 12. The bars 120 could then contact the film, move down a distance, such as from about 5 to about 50 percent of the sachet length, with their movement matched with the film speed, then retract and return to the starting contact position. It is desirable that the motion and length of the seal bars are designed to ensure that there is a contiguous MD seal between what will be successive sachets prior to cutting the webs into individual sachets.

Further, the nozzles 118 can be moved such that the nozzle tip 118 always remains at a fixed distance from the fill target. For example, if the bottom of the sachet is located 25 mm below the tip 118 of the nozzle 118 when the filling starts, the nozzle 118 could retract upward as the filling progresses such as to maintain at least the 25 mm spacing from the tip 118 of the nozzle 118 to the top of the fluid patch. The nozzle 118 could then retract faster upward at the end of the fill to allow for the CD sealer 42 to close. One other alternative for nozzle movement would be to have the nozzles 118 spaced farther away from the CD seal bar 122 when the seal is first made to reduce the deformation in the sachet. The tip 118 of the nozzle 118 could then lower into the sachet once the CD seal process has been initiated to progress through the bottom-up fill sequence described above.

The process for making the sachets may comprise an apparatus for forming machine direction slits and an apparatus for cross machine direction perforation/cutting. The apparatus for forming machine direction slits and the apparatus for cross machine direction perforation/cutting may be located upstream, or downstream of the cross-machine direction sealing device 122. For example, the apparatus for forming machine direction slits may be located upstream of the cross-machine direction sealing device 122, and the apparatus for cross machine direction perforation/cutting may be located downstream of the cross-machine direction sealing device 122. The machine direction slitting can be done by any suitable mechanism 126, including but not limited to by a crush slitter against an anvil or by a shear slitting apparatus. The web of unit dose packages can be slit between each lane or otherwise as desired. The slits can be continuous or they can be intermittent perforations. The cross machine direction perforation process can be designed and operated to cut between specified rows to make mats (matrices of products). Mechanical tooling can be used for both the machine direction slitting apparatus and the cross-machine direction slitting apparatus. However, laser slitting in the machine direction or cross machine direction can be utilized. After the slitting and perforation/cutting operations are completed, the production of the sachets is complete.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An apparatus for sealing two moving webs of material together, wherein said webs are moving in a machine direction and said webs have a width, and said webs of material have portions which are non-planar across their width, said apparatus comprising:
   a) a first component having a web-contacting surface configured to contact at least one of the two moving webs the first component having at least one recess in the web-contacting surface;
   b) a second component opposing said first component and having a web-contacting surface configured to contact at least one of the two moving webs, said second component comprising at least one projection that mates with said at least one recess in the web-contacting surface of said first component, the moving webs of material being located between webs of material between the first and second components; and
   c) a sealing mechanism located on or proximate to said first and second components, said sealing mechanism being configured to seal portions of said moving webs of material together;
   wherein said at least one projection and said at least one recess are positioned and configured to stretch said two moving webs when said at least one projection mates with said at least one recess, said at least one projection and said at least one recess being configured to not seal together said two moving webs.

2. The apparatus of claim 1 wherein said sealing mechanism is configured to form a cross-machine direction oriented seal across said webs of material.

3. The apparatus of claim 2 wherein at least a portion of said sealing mechanism is located upstream of said first and second components.

4. The apparatus of claim 3 wherein at least a portion of said sealing mechanism is located downstream of said first and second components.

5. The apparatus of claim 2 wherein at least a portion of said sealing mechanism is located downstream of said first and second components.

6. The apparatus of claim 2 wherein said sealing mechanism comprises a pair of cross-machine direction seal-forming elements, wherein said cross-machine direction seal-forming elements are spaced apart in the machine direction, and at least a portion of said first and second components are located between the cross-machine direction seal-forming elements in the machine direction.

7. The apparatus of claim 1 wherein said sealing mechanism is located on at least one of said first and second components and at least one of said first or second components is movable toward the other of said first or said second component so that when said first or second component moves toward the other of said first or second component, it both flattens said non-planar portions and forms a seal.

8. The apparatus of claim 1 wherein said at least one projection comprises a projecting element that is spring-loaded.

9. The apparatus of claim 1 wherein the web-contacting surfaces of said first and second component have a sinusoidal wave configuration having crests, wherein the crests of the waves extend in the machine direction.

* * * * *